US012163086B2

(12) United States Patent
Kim et al.

(10) Patent No.: US 12,163,086 B2
(45) Date of Patent: Dec. 10, 2024

(54) DISPERSANT AND COMPOSITION

(71) Applicant: SAMSUNG ELECTRO-MECHANICS CO., LTD., Suwon-si (KR)

(72) Inventors: Young O Kim, Suwon-si (KR); Chang Hyun Yoon, Suwon-si (KR); Eun Jung Lim, Suwon-si (KR); Jung Hyun Lee, Suwon-si (KR); Choon Keun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 189 days.

(21) Appl. No.: 17/687,785

(22) Filed: Mar. 7, 2022

(65) Prior Publication Data

US 2022/0403247 A1 Dec. 22, 2022

(30) Foreign Application Priority Data

May 25, 2021 (KR) .................. 10-2021-0067189
Nov. 29, 2021 (KR) .................. 10-2021-0167098

(51) Int. Cl.
*C09K 23/14* (2022.01)
*C09C 1/00* (2006.01)
*C09C 3/08* (2006.01)

(52) U.S. Cl.
CPC ............ *C09K 23/14* (2022.01); *C09C 1/00* (2013.01); *C09C 3/08* (2013.01); *C01P 2002/82* (2013.01); *C01P 2004/64* (2013.01)

(58) Field of Classification Search
None
See application file for complete search history.

(56) References Cited

U.S. PATENT DOCUMENTS

| 8,697,791 | B2 * | 4/2014 | Iwasa .................. C08F 228/04 524/406 |
| 2006/0189822 | A1 | 8/2006 | Yoon et al. |
| 2011/0282025 | A1 | 11/2011 | Hosokawa et al. |
| 2017/0080397 | A1 | 3/2017 | Ishigure et al. |
| 2020/0339782 | A1 | 10/2020 | Sato |
| 2020/0354517 | A1 | 11/2020 | Tomonari |
| 2021/0198513 | A1 | 7/2021 | Sugiura |

FOREIGN PATENT DOCUMENTS

| CN | 102341363 A | 2/2012 |
| CN | 106457179 A | 2/2017 |
| CN | 111465589 A | 7/2020 |
| CN | 111788247 A | 10/2020 |
| JP | 2013-199388 A | 10/2013 |
| JP | 2016-184099 A | 10/2016 |
| JP | 2017-222777 A | 12/2017 |
| KR | 10-2006-0084785 A | 7/2006 |
| KR | 10-2014-0119998 A | 10/2014 |

(Continued)

OTHER PUBLICATIONS

Machine translation of JP2013199388 (Year: 2013).*

(Continued)

*Primary Examiner* — Michael Forrest
(74) *Attorney, Agent, or Firm* — NSIP Law

(57) ABSTRACT

The present disclosure relates to a dispersant containing a specific compound having a fluorene skeleton, and a composition using the same.

20 Claims, 2 Drawing Sheets

(56) References Cited

FOREIGN PATENT DOCUMENTS

TW 202000598 A 1/2020
WO WO-2006046736 A1 * 5/2006 ........... C07C 323/52

OTHER PUBLICATIONS

Taiwanese Office Action Issued on Feb. 3, 2023, in counterpart of Taiwanese Patent Application No. 111108818 (4 Pages in English, 3 Pages in Chinese).
Korean Office Action issued on Mar. 1, 2023, in counterpart Korean Patent Application No. 10-2021-0167098 (6 pages in English, 5 pages in Korean).

* cited by examiner

DISPERSANT AND COMPOSITION

CROSS-REFERENCE TO RELATED APPLICATION(S)

This application claims benefit of priority to Korean Patent Application Nos. 10-2021-0067189, filed on May 25, 2021, and 10-2021-0167098, filed on Nov. 29, 2021, in the Korean Intellectual Property Office, the entire disclosures of which are incorporated herein by reference for all purposes.

BACKGROUND

1. Field

The present disclosure relates to a dispersant and a composition using the same.

2. Description of Related Art

Example optical characteristics of a camera lens material may be largely divided into refractive index, birefringence, Abbe number, transmittance, and the like, and it is typically important to design a camera lens material to satisfy each of the characteristics. In particular, the refractive index is typically the most important factor. As the refractive index is increased, the lens may be manufactured at a thinner thickness and the resolution may be increased. Therefore, the refractive index is a point characteristic in the development of a lens material.

In order to manufacture a camera lens having a high refractive index, an inorganic material such as glass or a high-refractive-index polymer has been used. A polymer material has many advantages compared to the inorganic material because it is light, not easily broken, and inexpensive. In addition, since a range of a refractive index may be adjusted according to a chemical structure of a polymer, the polymer material may be used as an optical material according to the purpose.

However, there are limits to the increasing of the refractive index by changing the chemical structure of the polymer.

SUMMARY

In one general aspect, a dispersant may include a compound represented by Chemical Formula 1:

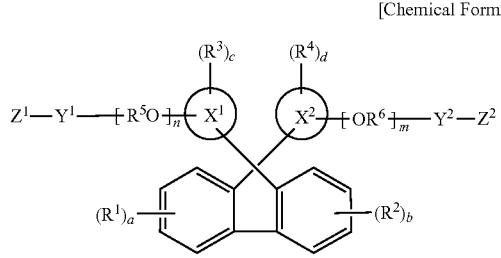

[Chemical Formula 1]

wherein each of $X^1$ and $X^2$ is an aromatic ring, each of $R^1$, $R^2$, $R^3$ and $R^4$ is a substituent, each of a, b, c, and d is an integer of 0 to 4, each of $R^5$ and $R^6$ is an aliphatic chain, each of n and m is an integer of 2 to 20, each of $Y^1$ and $Y^2$ is a bonding group represented by the following Chemical Formula 2, and each of $Z^1$ and $Z^2$ is a terminal group represented by the following Chemical Formula 3 or 4,

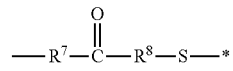

[Chemical Formula 2]

wherein $R^7$ is an O, N, or S atom, $R^8$ is an aliphatic chain, and —* represents a site for linking to $Z^1$ or $Z^2$,

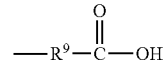

[Chemical Formula 3]

wherein $R^9$ is an aliphatic chain,

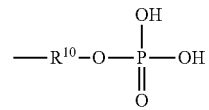

[Chemical Formula 4]

wherein $R^{10}$ is an aliphatic chain.

At least one of $X^1$ and $X^2$ in Chemical Formula 1 may be selected from the group consisting of a benzene ring, a naphthalene ring, and a biphenyl ring.

At least one of $X^1$ and $X^2$ in Chemical Formula 1 may be a benzene ring.

At least one of $R^5$ and $R^6$ in Chemical Formula 1 may be a $C_2$ to $C_6$ saturated hydrocarbon chain.

At least one of $R^5$ and $R^6$ in Chemical Formula 1 may be selected from the group consisting of $(CH_2—CH_2)$—, —$(CH_2—CH_2—CH_2)$—, —$(CH_2—CH_2—CH_2—CH_2)$—, —$(CH_2—CH_2—CH_2—CH_2—CH_2)$—, and —$(CH_2—CH_2—CH_2—CH_2—CH_2—CH_2)$—.

At least one of $R^1$, $R^2$, $R^3$ and $R^4$ in Chemical Formula 1 may be selected from the group consisting of a halogen group, a cyano group, a nitro group, a hydroxy group, a $C_1$ to $C_{10}$ alkyl group, a $C_1$ to $C_{10}$ alkoxy group, a $C_2$ to $C_{10}$ alkene group, a $C_2$ to $C_{10}$ alkyne group, and a $C_4$ to $C_{10}$ alkenyne group.

The $C_1$ to $C_{10}$ alkyl group may be selected from the group consisting of a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a hexyl group, a 1-methylpentyl group, a 2-methylpentyl group, a 4-methyl-2-pentyl group, a 3,3-dimethylbutyl group, a 2-ethylbutyl group, a heptyl group, a 1-methylhexyl group, an octyl group, a nonyl group, and a decyl group.

The $C_1$ to $C_{10}$ alkoxy group may be selected from the group consisting of methoxy, ethoxy, propoxy, isopropoxy, butoxy, isobutoxy, tert-butoxy, sec-butoxy, pentyloxy, neopentyloxy, isopentyloxy, hexyloxy, 3,3-dimethylbutyloxy, 2-ethylbutyloxy, octyloxy, nonyloxy, and decyloxy.

The $C_2$ to $C_{10}$ alkene group may be selected from the group consisting of a vinyl group, a 1-propenyl group, and a 1-butenyl group.

The $C_2$ to $C_{10}$ alkyne group may be selected from the group consisting of an ethynyl group, a 1-propynyl group, and a 1-butynyl group.

The $C_4$ to $C_{10}$ alkenyne group may be selected from the group consisting of a pent-1-en-4-yne group, and a pent-3-en-1-yne group.

At least one of a, b, c, and d in Chemical Formula 1 may be an integer of 0.

In Chemical Formula 2, $R^7$ may be an O atom and $R^8$ may be a $C_2$ to $C_6$ saturated hydrocarbon chain.

$R^9$ in Chemical Formula 3 may be a $C_2$ to $C_6$ saturated hydrocarbon chain.

$R^{10}$ in Chemical Formula 4 may be a $C_2$ to $C_6$ saturated hydrocarbon chain.

The compound represented by Chemical Formula 1 may include a compound represented by the following Chemical Formula 5:

[Chemical Formula 5]

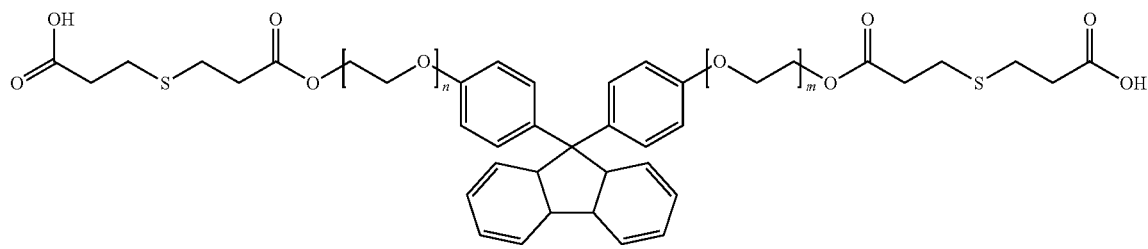

wherein each of n and m may be an integer of 2 to 20.

The compound represented by Chemical Formula 1 may include a compound represented by the following Chemical Formula 6:

[Chemical Formula 6]

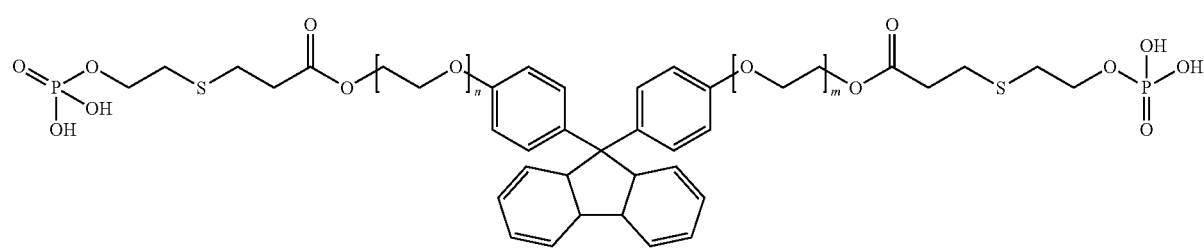

wherein each of n and m may be an integer of 2 to 20.

In one general aspect, a composition includes zirconia nanoparticles subjected to a surface treatment with a dispersant, and a solvent, wherein the dispersant may be the dispersant of any embodiment disclosed herein, as a non-limiting example.

The dispersant may be adsorbed to the surface of the zirconia nanoparticle.

The solvent may be selected from the group consisting of tetrahydrofuran, methylene chloride, and chloroform.

Other features and aspects will be apparent from the following detailed description, the drawings, and the claims.

Figure 1:
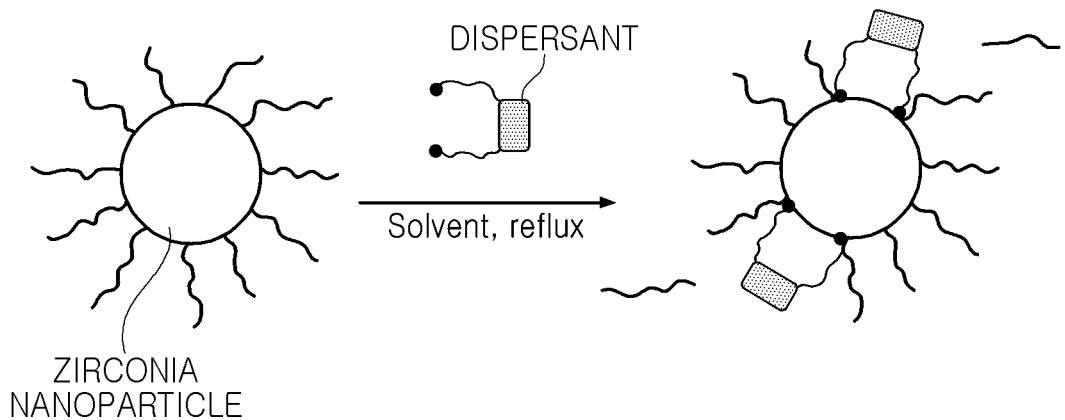
FIG. 1 is a schematic perspective view illustrating surface treatment of a zirconia nanoparticle using a dispersant according to one or more embodiments.

Except where it may be otherwise apparent, the drawings may not be to scale, and the relative size, shape, proportions, and depiction of elements in the drawings may be exaggerated for clarity, illustration, and convenience.

DETAILED DESCRIPTION

The following detailed description is provided to assist the reader in gaining a comprehensive understanding of the processes, methods, materials, compounds, products, apparatuses, and/or systems described herein. However, various changes, modifications, and equivalents of the processes, methods, materials, compounds, products, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the processes, methods, materials, compounds, products, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As non-limiting examples, such terms as "comprises," "includes," and "has" specify the presence of stated features, numbers, operations, members, elements, and/or combinations thereof, but do not preclude the presence or addition of one or more other features, numbers, operations, members, elements, and/or combinations thereof. Additionally, herein, the use of the term "may" herein with respect to an example or embodiment (e.g., as to what an example or embodiment may include or implement) means that at least one example or embodiment exists where such a feature is included or implemented, while all examples are not limited thereto. As non-limiting examples, expressions such as "may have," "may include," or the like indicate the presence of a feature (e.g., a numerical value, a function, an operation, or a component such as a part or the like), corresponding thereto in one or more embodiments, and do not exclude the presence of additional features, all embodiments are not limited thereto.

Herein, expressions such as "A and/or B," "at least one of A or B," or "one or more of A and B" may include all possible combinations of items listed together. For example, "A and/or B," "at least one of A or B," or "one or more of A and B" may refer to (i) including at least one A; (ii) including at least one B, or (iii) including both at least one A and at least one B.

Various embodiments may provide a dispersant capable of uniformly dispersing high-refractive-index nanoparticles in an optical polymer, as well as various compositions using the same, for example, using a dispersant for example optical lens embodiments of example camera module embodiments. Still further, in one or more embodiments the dispersant may contain a specific compound having a fluorene skeleton.

Dispersant

In order to manufacture a camera lens embodiment having a high refractive index, a high-refractive-index polymer having various advantages may be used. It is desirable to increase the refractive index by mixing high-refractive-index nanoparticles with a polymer matrix.

Here, nanoparticles such as zirconium oxide and titanium oxide nanoparticles may have a wavelength less than a minimum wavelength of light in order to reduce light scattering. For example, the nanoparticles may be prepared with a uniform diameter of 15 nm or less. In addition, in order to prevent a decrease in intensity of transmitted light due to Rayleigh scattering and to efficiently increase a refractive index of a composite material, the nanoparticles may be uniformly dispersed in the polymer matrix.

Meanwhile, a composite material used for optical purposes may be prepared by mixing nanoparticles with a thermosetting polymer or a thermoplastic polymer. A nanoparticle and thermosetting polymer composite material may be prepared by mixing liquid acrylic monomers and a nanoparticle with each other and then polymerizing the mixture. In this case, a surface of the nanoparticle may react with acryl and the nanoparticle may be modified to be a molecule having a structure similar to that of acryl, such that miscibility of two different substances may be increased.

In addition, in order to mix the nanoparticles using the thermoplastic polymer, a method of mixing nanoparticles and a polymer in molten states by applying heat and a method of dissolving both a polymer and nanoparticles in a solvent and then removing the solvent may be used. In these cases, in order to increase interface affinity between two different substances and to uniformly disperse the nanoparticles in the solvent, a surface modification of the nanoparticles with a dispersant may be performed.

In particular, as an optical thermoplastic polymer, a cyclic olefin polymer, polyester, polycarbonate, and the like may be used, for example. Thereamong, in some examples, it may be preferable that, as a high-refractive-index thermoplastic polymer, polyester and polycarbonate containing a large number of aromatic rings at a high volume ratio may be used. In one example, it may be preferable that fluorene is used for an optical lens embodiment because it does not cause birefringence due to structural characteristics thereof.

Therefore, in order to increase interface affinity between a thermoplastic polymer having a fluorene group and a nanoparticle, for example, a zirconia nanoparticle having a hydrophilic surface, a design of a chemical structure of a dispersant suitable for this structure may be required.

In this case, a dispersant according one or more embodiments may contain a specific compound having a fluorene skeleton, for example, a compound represented by the following Chemical Formula 1.

[Chemical Formula 1]

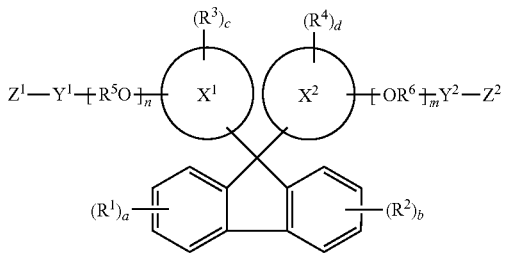

In Chemical Formula 1, each of $X^1$ and $X^2$ may be an aromatic ring. As non-limiting examples, the aromatic ring may include a benzene ring, a naphthalene ring, a biphenyl ring, and the like. In one example, it may be preferable that the aromatic ring is a benzene ring, but examples are not limited thereto. The aromatic ring may have a substituent. Examples of the substituent may include a halogen group, a cyano group, a nitro group, a hydroxy group, a $C_1$ to $C_{10}$ alkyl group, a $C_1$ to $C_{10}$ alkoxy group, a $C_2$ to $C_{10}$ alkene group, a $C_2$ to $C_{10}$ alkyne group, a $C_4$ to $C_{10}$ alkenyne group, and the like. Each of the alkyl group, the alkene group, the alkyne group, and the alkenyne group may have a linear or branched form.

As an example, the $C_1$ to $C_{10}$ alkyl group may be, but is not limited to, a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a hexyl group, a 1-methylpentyl group, a 2-methylpentyl group, a 4-methyl-2-pentyl group, a 3,3-dimethylbutyl group, a 2-ethylbutyl group, a heptyl group, a 1-methylhexyl group, an octyl group, a nonyl group, a decyl group, or the like.

As an example, the $C_1$ to $C_{10}$ alkoxy group may be, but is not limited to, methoxy, ethoxy, propoxy, isopropoxy, butoxy, isobutoxy, tert-butoxy, sec-butoxy, pentyloxy, neopentyloxy, isopentyloxy, hexyloxy, 3,3-dimethylbutyloxy, 2-ethylbutyloxy, octyloxy, nonyloxy, decyloxy, or the like.

As an example, the $C_2$ to $C_{10}$ alkene group may be, but is not limited to, a vinyl group, a 1-propenyl group, a 1-butenyl group, or the like, the $C_2$ to $C_{10}$ alkyne group may be, but is not limited to, an ethynyl group, a 1-propynyl group, a 1-butynyl group, or the like, and the Ca to $C_{10}$ alkenyne group may be, but is not limited to, a pent-1-en-4-yne group, a pent-3-en-1-yne group, or the like.

In addition, each of $R^1$, $R^2$, $R^3$ and $R^4$ may be a substituent. Examples of the substituent may include a halogen group, a cyano group, a nitro group, a hydroxy group, a $C_1$ to $C_{10}$ alkyl group, a $C_1$ to $C_{10}$ alkoxy group, a $C_2$ to $C_{10}$ alkene group, a $C_2$ to $C_{10}$ alkyne group, a $C_4$ to $C_{10}$ alkenyne group, and the like, as described above. Each of the alkyl group, the alkene group, the alkyne group, and the alkenyne group may be a linear or branched form. Specific examples of the alkyl group, the alkene group, the alkyne group, and the alkenyne group are as described above, but are not limited thereto.

In addition, each of a, b, c, and d may be an integer of 0 to 4. In one example, it may be preferable that each of a, b, c, and d are 0. Accordingly, the fluorene skeleton and the aromatic ring may not have a substituent, but are not limited thereto.

In addition, each of $R^5$ and $R^6$ may be an aliphatic chain. The aliphatic chain may be a saturated hydrocarbon chain, an unsaturated hydrocarbon chain, or the like. Each of the saturated hydrocarbon chain and the unsaturated hydrocarbon chain may be a linear or branched form. In an example, each of $R^5$ and $R^6$ may be a $C_2$ to $C_6$ saturated hydrocarbon chain, for example, —(CH$_2$—CH$_2$)—, —(CH$_2$—CH$_2$—CH$_2$)—, —(CH$_2$—CH$_2$—CH$_2$—CH$_2$)—, —(CH$_2$—CH$_2$—CH$_2$—CH$_2$—CH$_2$)—, —(CH$_2$—CH$_2$—CH$_2$—CH$_2$—CH$_2$—CH$_2$)—, or the like, but examples are not limited thereto. In one example, it may be preferable that each of $R^5$ and $R^6$ are a $C_2$ to $C_4$ saturated hydrocarbon chain, for example, —(CH$_2$—CH$_2$)—, —(CH$_2$—CH$_2$—CH$_2$)—, —(CH$_2$—CH$_2$—CH$_2$—CH$_2$)—, or the like, but examples are not limited thereto.

In addition, each of n and m may be an integer of 2 to 20. In one example, it may be preferable that each of n and m are integers of 5 to 10, but examples are not limited thereto. The length of —OR$^5$— or the chain of —OR$^5$— may be controlled according to the number of n and m, and as a result, a molecular weight of the compound may be controlled. Thus, an interface interaction between the zirconia nanoparticle and the polymer may be controlled. For example, as the length of —OR$^5$— or the chain of —OR$^5$— is decreased, the zirconia nanoparticle and the polymer may have an affinity interaction.

In addition, each of $Y^1$ and $Y^2$ may be a bonding group represented by the following Chemical Formula 2.

[Chemical Formula 2]

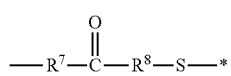

In Chemical Formula 2, $R^7$ may be an O, N, or S atom, for example. In one example, it may be preferable that $R^7$ is an O atom, but examples are not limited thereto. In addition, $R^8$ may be an aliphatic chain, e.g., a $C_2$ to $C_6$ saturated hydrocarbon chain. In one example, it may be preferable that the aliphatic chain is a $C_2$ to $C_4$ saturated hydrocarbon chain, but examples are not limited thereto. Specific examples of the $C_2$ to $C_6$ saturated hydrocarbon chain and the $C_2$ to $C_4$ saturated hydrocarbon chain may be as described above, but examples are not limited thereto. In addition, —* may represent a site for linking to $Z^1$ or $Z^2$. For example, $Y^1$ and $Y^2$ may be linked to $Z^1$ and $Z^2$, respectively, at —*, and $Y^1$ and $Y^2$ may be linked to $R^5$ and $R^6$, respectively, at the opposite site.

In addition, each of $Z^1$ and $Z^2$ may be a terminal group represented by the following Chemical Formula 3 or 4.

[Chemical Formula 3]

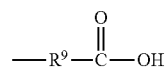

In Chemical Formula 3, $R^9$ may be an aliphatic chain, e.g., a $C_2$ to $C_6$ saturated hydrocarbon chain. In one example, it may be preferable that the aliphatic chain is a $C_2$ to $C_4$ saturated hydrocarbon chain, but examples are not limited thereto. Specific examples of the $C_2$ to $C_6$ saturated hydrocarbon chain and the $C_2$ to $C_4$ saturated hydrocarbon chain may be as described above, but examples are not limited thereto.

[Chemical Formula 4]

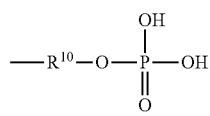

In Chemical Formula 4, $R^{10}$ may be an aliphatic chain, e.g., a $C_2$ to $C_6$ saturated hydrocarbon chain. In one example, it may be preferable that the aliphatic chain is a $C_2$ to $C_4$ saturated hydrocarbon chain, but examples are not limited thereto. Specific examples of the $C_2$ to $C_6$ saturated hydrocarbon chain and the $C_2$ to $C_4$ saturated hydrocarbon chain may be as described above, but are not limited thereto.

As a non-limiting example, the compound represented by Chemical Formula 1 may include a compound represented by the following Chemical Formula 5. The compound represented by the following Chemical Formula 5 may be prepared by the following Reaction Formula 1, but examples not limited thereto.

[Chemical Formula 5]

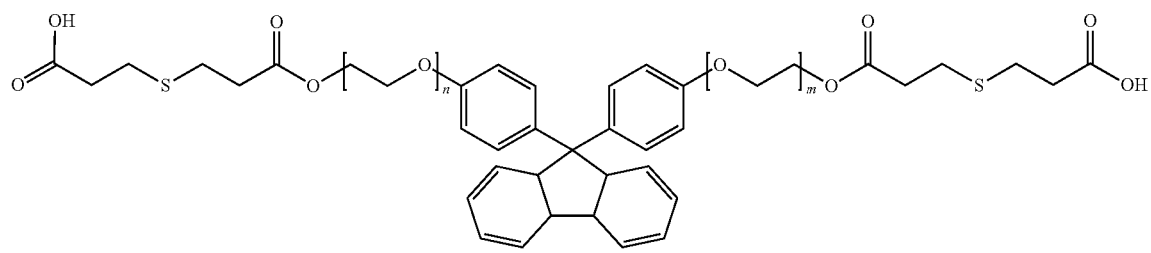

In Chemical Formula 5, each of n and m may be an integer of 2 to 20. In one example, it may be preferable that each of n and m are integers of 5 to 10, but examples are not limited thereto.

[Reaction Formula 1]

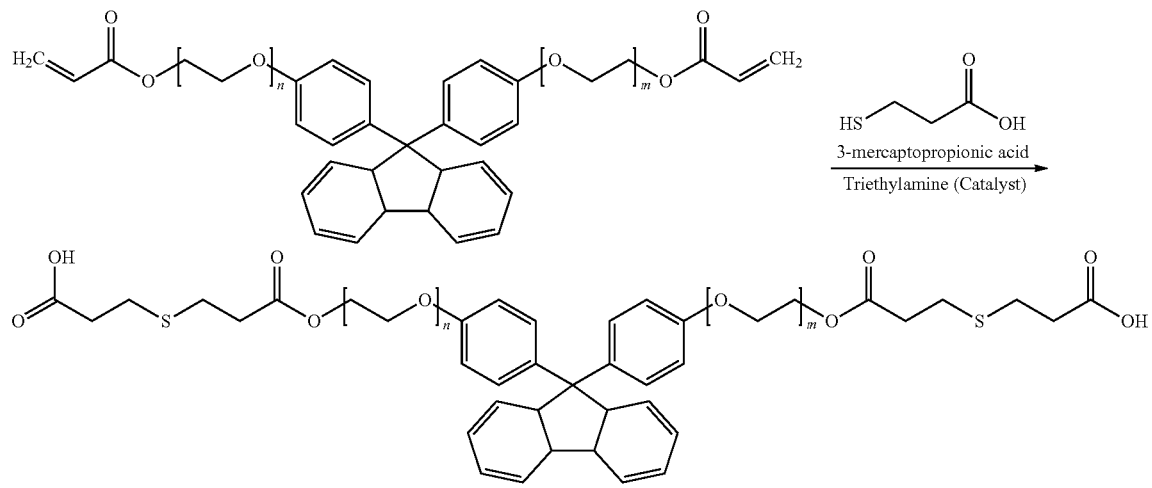

As another non-limiting example, the compound represented by Chemical Formula 1 may include a compound represented by the following Chemical Formula 6. The compound represented by the following Chemical Formula 6 may be prepared by the following Reaction Formula 2, but examples are not limited thereto.

[Chemical Formula 6]

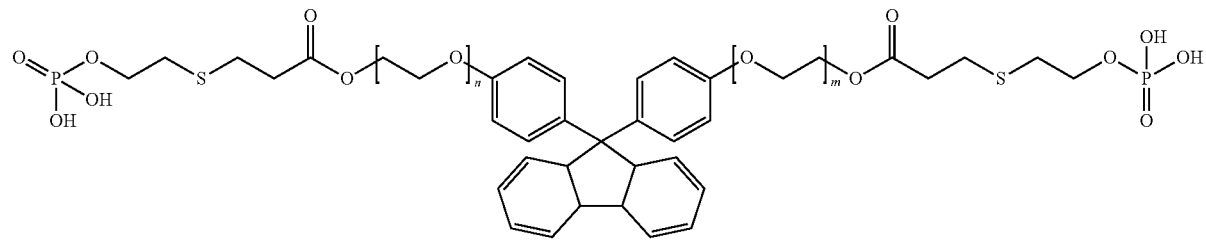

In Chemical Formula 6, each of n and m may be an integer of 2 to 20. In one example, it may be preferable that each of n and m are integers of 5 to 10, but examples are not limited thereto.

[Reaction Formula 2]

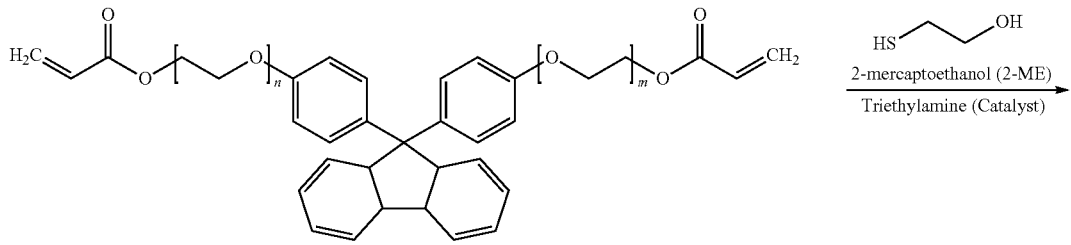

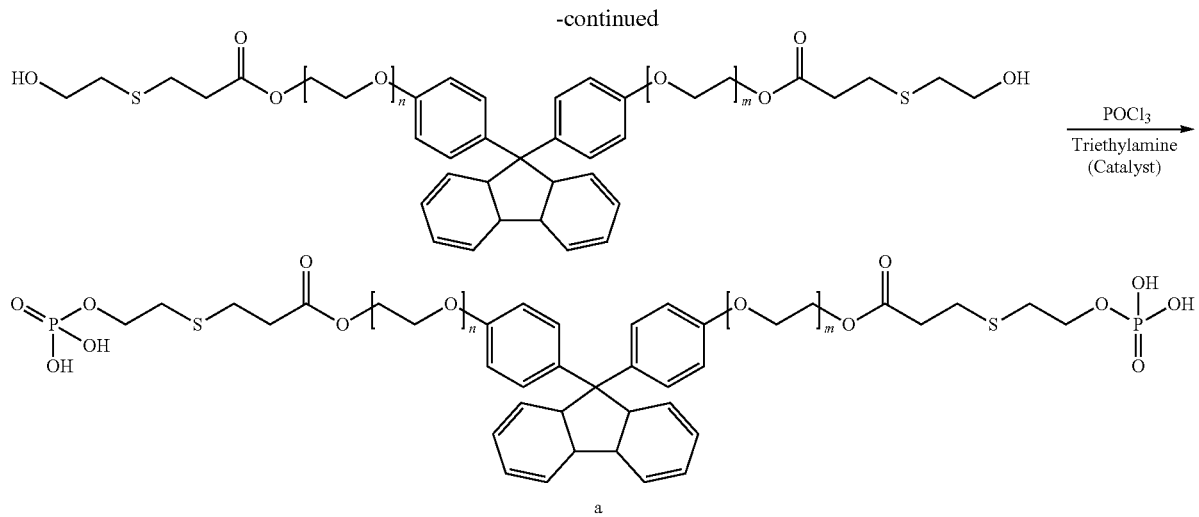

Composition

A composition according to one or more embodiments may contain zirconia nanoparticles subjected to a surface treatment with a dispersant and a solvent. In this case, the dispersant may be the dispersant according to one or more embodiments, such as described above. For example, Zirconia nano-sol is subjected to a surface treatment using a dispersant, zirconia nanoparticles are precipitated, a supernatant is removed using centrifugation to obtain settled nanoparticles, and then the nanoparticles are dispersed in a solvent, such that a composition according to one or more embodiments may be prepared. The dispersant may be adsorbed to the surface of the zirconia nanoparticle, which may be observed using optical analysis, for example, PM-IRRAS, but examples are not limited thereto.

Meanwhile, the solvent may be tetrahydrofuran, methylene chloride, chloroform, or the like, but examples are not limited thereto. This kind of solvent may increase easiness of a composite material preparation process. For example, boiling points of tetrahydrofuran, methylene chloride, and chloroform are approximately about 66° C., 40° C., and 61° C., respectively. Therefore, these solvents may dissolve a polymer having a boiling point of 100° C. or lower, which will be described below, and may thus be effectively used. The polarity may be higher in the order of chloroform, tetrahydrofuran, and methylene chloride. As the polarity is higher, transparency of a composite material to be described below may be increased. For example, when a composite material to be described below is prepared using a solvent having high polarity, phase separation between the zirconia nanoparticle subjected to the surface treatment with the dispersant and a polymer to be described below may be more effectively suppressed.

Meanwhile, a surface treatment embodiment using the dispersant may be performed by adding zirconia nano-sol and a dispersant solution to a reaction solvent such as tetrahydrofuran or chloroform and causing a reaction under reflux, as illustrated in FIG. 1. In this case, even when the same dispersant is used, a degree of dispersion in the solvent and an interaction with a polymer to be described below may be controlled depending on the amount of dispersant fixed to the surface of the zirconia nanoparticle. For example, the polarity of the surface of the zirconia nanoparticle may be controlled by adjusting the amount of synthesized dispersant, which may affect the degree of dispersion according to the solvent. This may also affect the interaction with a polymer to be described below.

Composite Material

A composite material according to one or more embodiments may contain a polymer and zirconia nanoparticles subjected to a surface treatment with a dispersant. In this case, the dispersant may be a dispersant according to one or more embodiments described above, for example. A composite material according to one or more embodiments may be prepared by combining a polymer and a zirconia nanoparticle subjected to a surface treatment with a dispersant. For example, a composite material may be prepared by applying a composition according to one or more embodiments, such as described above, to a polymer and performing drying. Alternatively, a composite material may be prepared by adding a polymer to a composition according to one or more embodiments, such as described above, and performing drying. The polymer and the zirconia nanoparticle subjected to the surface treatment with the dispersant may be bonded to each other.

Meanwhile, the polymer may be used as a material for an optical lens embodiment of a camera module embodiment, and may thus be a polymer having a high refractive index. For example, the polymer may be a thermoplastic polymer having a fluorene group. For example, the polymer may be polyester having a fluorene group, polycarbonate having a fluorene group, or the like, but examples are not limited thereto. Since the zirconia nanoparticle is relatively hydrophilic, the zirconia nanoparticle may be easily bonded to such a thermoplastic polymer, for example, polyester, polycarbonate, or the like, by hydrogen bonding.

Meanwhile, in a case of a material for an optical lens embodiment, e.g., where transparency is important, a dispersant having a structure similar to that of the main chain of the polymer should be synthesized, the dispersant should be treated on the surface of the nanoparticle, and then, the nanoparticles should be uniformly dispersed in a polymer matrix as well as a desired solvent. When the nanoparticles are not dispersed, a phase separation phenomenon in which the polymer chains and the nanoparticles tend to coexist with each other, respectively, occurs, which may impair the transparency of the composite material due to agglomerated nanoparticles. Therefore, it may be important to design a dispersant capable of dispersing the nanoparticles in both the solvent and the polymer matrix. In this case, a composite material according one or more embodiments may be effectively used for an optical lens embodiment of a camera module embodiment.

However, the descriptions of the present disclosure are not limited to such optical lens embodiments of such camera module embodiments, and may be applied to other functional materials in alternate embodiments.

EXPERIMENTAL EXAMPLES

Synthesis Example 1

First, 1 equivalent of a fluorene compound (a starting material of Reaction Formula 1, molecular weight of 900), 4.8 equivalents of 3-mercaptopropionic acid, and 4.8 equivalents of triethylamine were added to an acetonitrile solvent, and then, the mixture was allowed to react at room temperature for 24 hours. Thereafter, methylene chloride was added to the reaction solution, and then, an organic layer was extracted five times with a 35% aqueous hydrogen chloride solution diluted 10-fold. Sodium sulfate was added to the organic layer to remove and evaporate remaining moisture, thereby obtaining a dispersant containing a compound represented by Chemical Formula 5 (n and m are the molecular weight of the starting material).

Synthesis Example 2

A dispersant containing a compound represented by Chemical Formula 5 (n and m are the molecular weight of the starting material) was obtained by performing the reaction and the like in the same manner as that of Synthesis Example 1, except that the molecular weight of the fluorene compound (the starting material of Reaction Formula 1) was 1,350.

Synthesis Example 3

First, 1 equivalent of a fluorene compound (a starting material of Reaction Formula 2, molecular weight of 900), 4.8 equivalents of 3-mercaptoethanol, and 4.8 equivalents of triethylamine were added to an acetonitrile solvent, and then, the mixture was allowed to react at room temperature for 24 hours. Thereafter, methylene chloride was added to the reaction solution, and then, an organic layer was extracted five times with a 35% aqueous hydrogen chloride solution diluted 10-fold. Sodium sulfate was added to the organic layer to remove and evaporate remaining moisture, thereby obtaining an intermediate compound (an intermediate material of Reaction Formula 2). Next, the obtained intermediate compound, 2.54 equivalents of phosphoryl chloride, and 2.54 equivalents of triethyleneamine were added to a tetrahydrofuran solvent, and then, the mixture was allowed to react at room temperature for 24 hours. Thereafter, deionized water was added to the reaction solution, and then, an organic layer was extracted three times with methylene chloride. Sodium sulfate was added to the organic layer to remove and evaporate remaining moisture, thereby obtaining a dispersant containing a compound represented by Chemical Formula 6 (n and m are the molecular weight of the starting material).

Synthesis Example 4

A dispersant containing a compound represented by Chemical Formula 6 (n and m are the molecular weight of the starting material) was obtained by performing the reaction and the like in the same manner as that of Synthesis Example 3, except that the molecular weight of the fluorene compound (the starting material of Reaction Formula 2) was 1,350.

Preparation Example 1

To 10 ml of a tetrahydrofuran reaction solvent, 30 wt % of zirconia nano-sol and a solution containing the dispersant obtained in Synthesis Example 1 were added, and the mixture was allowed to react under reflux for 2 hours. Thereafter, ethyl acetate was added to the reaction solution to precipitate surface-treated zirconia nanoparticles, a supernatant was removed using centrifugation (4,000 rpm, 10 minutes), and then, the settled surface-treated zirconia nanoparticles were dispersed in a solvent, thereby obtaining a composition.

Preparation Example 2

A composition was obtained by performing the surface treatment and the like in the same manner as that of Preparation Example 1, except that the dispersant obtained in Synthesis Example 2 was used instead of the dispersant obtained in Synthesis Example 1.

Preparation Example 3

A composition was obtained by performing the surface treatment and the like in the same manner as that of Preparation Example 1, except that the dispersant obtained in Synthesis Example 3 was used instead of the dispersant obtained in Synthesis Example 1.

Preparation Example 4

A composition was obtained by performing the surface treatment and the like in the same manner as that of Preparation Example 1, except that the dispersant obtained in Synthesis Example 4 was used instead of the dispersant obtained in Synthesis Example 1.

Example 1

Figure 2:
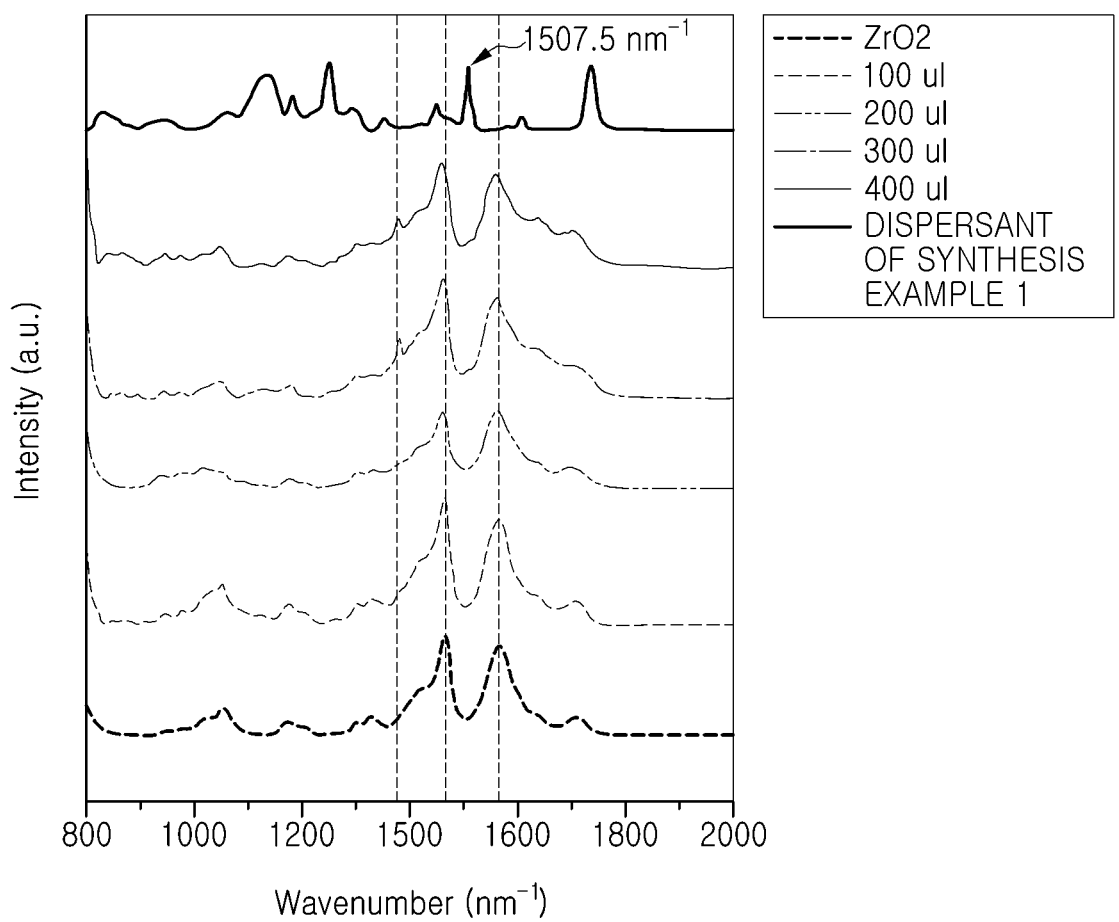
FIG. 2 is a schematic perspective view of infrared spectroscopy (IR) spectra according to the amount of dispersant coated on the surface of the surface-treated zirconia nanoparticle.

In the composition of Preparation Example 1, the zirconia nanoparticles were treated by varying the amount of the dispersant solution, and a change in functional group on the surface of the zirconia nanoparticle was analyzed using PM-IRRAS. The results are illustrated in FIG. 2. At this time, chloroform was used as a solvent of the composition.

Referring to FIG. 2, two main peaks of 1,464 $nm^{-1}$ and 1,567 $nm^{-1}$ appearing in the zirconia nanoparticle represent —COO— and —OH, respectively, and the two peaks shift to the left as the amount of the dispersant is increased, and from this, it is presumed that the dispersant is adsorbed to the surface of the zirconia nanoparticle, and a distribution density of the dispersant present on the particle surface is increased, causing hydrogen bonding.

On the other hand, in the treatment performed with the amount of the dispersant solution of 300 ul or more, a new peak of 1,379 $nm^{-1}$ appears, and from this, it is presumed that the previously adsorbed dispersant is desorbed and the amount of non-bridged —OH is increased.

On the other hand, in the treatment performed with the amount of the dispersant solution of 300 ul or more, a new peak of 1,507.5 $nm^{-1}$ appears, and this peak is the main peak that also appears in a single dispersant, which provides intuitive evidence that the dispersant is adsorbed to the surface of the zirconia nanoparticle.

Example 2

In the composition of Preparation Example 1, various composite materials were prepared while changing the solvent of the composition to each of tetrahydrofuran, methylene chloride, and chloroform. Specifically, high-refractive-index polyester having a fluorene group was mixed with each of the compositions obtained by using different solvents, and then, drying was performed, thereby preparing various composite materials. All other conditions, for example, the amount of the dispersant solution, were the same. Thereafter, the transparency of each of the prepared composite materials was visually observed.

As a result of comparison, as a solution having a higher polarity was used, the transparency was more excellent, that is, the transparency was more excellent in the order of the composite material prepared using chloroform (4.1), the composite material prepared using tetrahydrofuran (4.0), and the composite material prepared using methylene chloride (3.1).

Example 3

High-refractive-index polyester having a fluorene group was mixed with each of the compositions of Preparation Examples 1 to 4, and then, drying was performed, thereby obtaining composite materials 1 to 4. At this time, chloroform was used as a solvent in each of the compositions, and the amount of the dispersant solution was the same. Separately, zirconia nanoparticles not treated with a dispersant were mixed with high-refractive-index polyester having a fluorene group in 10 wt % of a chloroform solvent, and drying was performed, thereby preparing a composite material 5. Thereafter, the transparency of each of the composite materials 1 to 4 and the composite material 5 was visually observed.

As a result of comparison, the transparency of each of the composite materials 1 to 4 was excellent compared to the lesser desirable transparency of the composite material 5. Thereamong, the transparency of the composite material 5 and the transparency of the composite material 1 are respectively illustrated in FIGS. 3A and 3B.

Figure 3A:
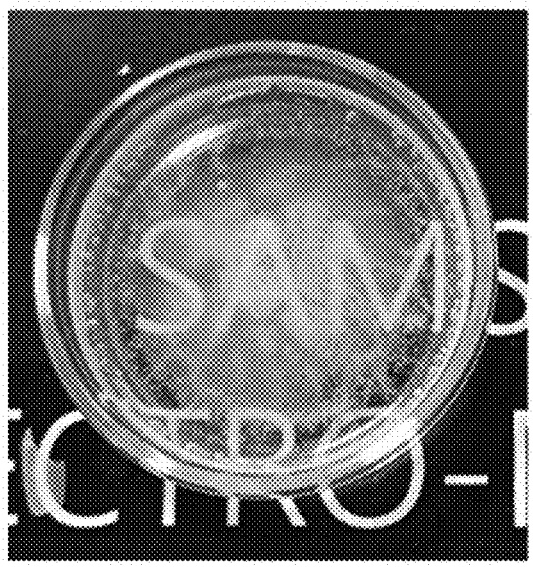
FIG. 3A is a schematic perspective view illustrating transparency of a composite material of a high-refractive-index polymer and a zirconia nanoparticle subjected to no surface treatment with the dispersant.
Figure 3B:
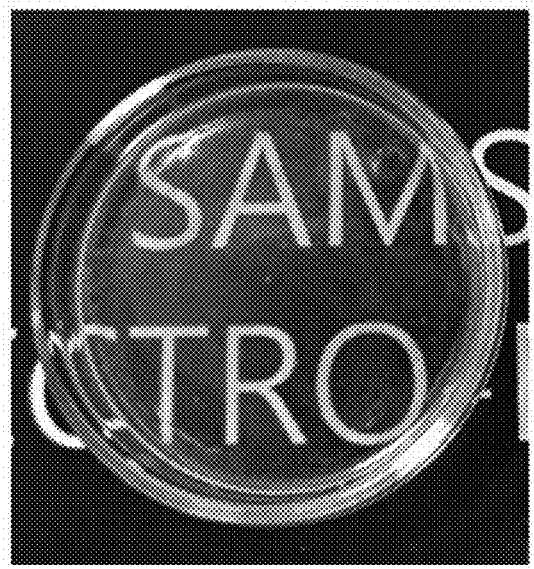
FIG. 3B is a schematic perspective view illustrating transparency of a composite material of a high-refractive-index polymer and a zirconia nanoparticle subjected to a surface treatment with the dispersant according to an embodiment.

FIG. 3A illustrates the transparency of the composite material 5, and FIG. 3B illustrates the transparency of the composite material 1 according to an embodiment. It may be appreciated from this that, in the case where the zirconia nanoparticles subjected to the surface treatment with the dispersant were used according to an embodiment of the present disclosure, the transparency is demonstrated in FIG. 3B to be excellent, compared to the lesser desirable case in which the zirconia nanoparticles subjected no surface treatment were used, as demonstrated in FIG. 3A.

As set forth above, according to one or more embodiments, a dispersant capable of uniformly dispersing high-refractive-index nanoparticles in an optical polymer, and a composition using the same, for example, a dispersant for an optical lens embodiment of a camera module embodiment and a composition using the same may be provided in various embodiments, such as described above, as non-limiting examples.

While various advantages and effects of various embodiments are not limited to the above, such advantages and effects, as well as other advantages and effects, may be more easily understood in the process of describing specific embodiments of the present disclosure.

Further, while this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Examples provided herein are considered to be able to be implemented by being combined in whole or in part one with one another. Suitable results may be achieved if the described techniques are performed in a different order, and/or if features are combined in a different manner, and/or replaced or supplemented by other features or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. A dispersant comprising a compound represented by the following Chemical Formula 1:

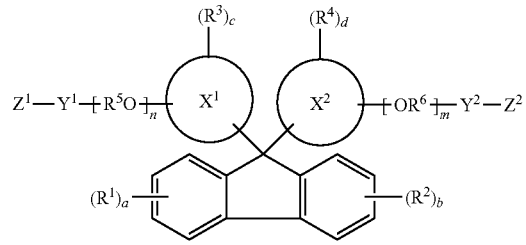

[Chemical Formula 1]

wherein each of $X^1$ and $X^2$ is an aromatic ring, each of $R^1$, $R^2$, $R^3$ and $R^4$ is a substituent, each of a, b, c, and d is an integer of 0 to 4, each of $R^5$ and $R^6$ is an aliphatic chain, each of n and m is an integer of 2 to 20, each of $Y^1$ and $Y^2$ is a bonding group represented by the following Chemical Formula 2, and each of $Z^1$ and $Z^2$ is a terminal group represented by the following Chemical Formula 3 or 4,

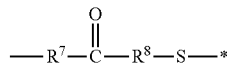

[Chemical Formula 2]

wherein $R^7$ is an O, N, or S atom, $R^8$ is an aliphatic chain, and —* represents a site for linking to $Z^1$ or $Z^2$,

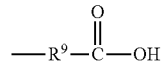

[Chemical Formula 3]

wherein $R^9$ is an aliphatic chain,

[Chemical Formula 4]

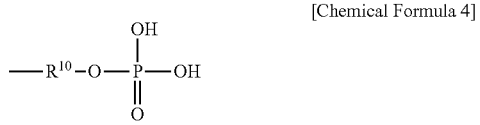

wherein $R^{10}$ is an aliphatic chain, and wherein at least one of $R^1$, $R^2$, $R^3$ and $R^4$ in Chemical Formula 1 is selected from the group consisting of a halogen group, a cyano group, a nitro group, a hydroxy group, a $C_1$ to $C_{10}$ alkyl group, a $C_1$ to $C_{10}$ alkoxy group, a $C_2$ to $C_{10}$ alkene group, a $C_2$ to $C_{10}$ alkyne group, and a $C_4$ to $C_{10}$ alkenyne group.

2. The dispersant of claim 1, wherein at least one of $X^1$ and $X^2$ in Chemical Formula 1 is selected from the group consisting of a benzene ring, a naphthalene ring, and a biphenyl ring.

3. The dispersant of claim 1, wherein at least one of $X^1$ and $X^2$ in Chemical Formula 1 is a benzene ring.

4. The dispersant of claim 1, wherein at least one of $R^5$ and $R^6$ in Chemical Formula 1 is a $C_2$ to $C_6$ saturated hydrocarbon chain.

5. The dispersant of claim 1, wherein at least one of $R^5$ and $R^6$ in Chemical Formula 1 is selected from the group consisting of $(CH_2-CH_2)-$, $-(CH_2-CH_2-CH_2)-$, $-(CH_2-CH_2-CH_2-CH_2)-$, $-(CH_2-CH_2-CH_2-CH_2-CH_2)-$, and $-(CH_2-CH_2-CH_2-CH_2-CH_2-CH_2)-$.

6. The dispersant of claim 1, wherein the $C_1$ to $C_{10}$ alkyl group is selected from the group consisting of a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a hexyl group, a 1-methylpentyl group, a 2-methylpentyl group, a 4-methyl-2-pentyl group, a 3,3-dimethylbutyl group, a 2-ethylbutyl group, a heptyl group, a 1-methylhexyl group, an octyl group, a nonyl group, and a decyl group.

7. The dispersant of claim 1, wherein the $C_1$ to $C_{10}$ alkoxy group is selected from the group consisting of methoxy, ethoxy, propoxy, isopropoxy, butoxy, isobutoxy, tert-butoxy, sec-butoxy, pentyloxy, neopentyloxy, isopentyloxy, hexyloxy, 3,3-dimethylbutyloxy, 2-ethylbutyloxy, octyloxy, nonyloxy, and decyloxy.

8. The dispersant of claim 1, wherein the $C_2$ to $C_{10}$ alkene group is selected from the group consisting of a vinyl group, a 1-propenyl group, and a 1-butenyl group.

9. The dispersant of claim 1, wherein the $C_2$ to $C_{10}$ alkyne group is selected from the group consisting of an ethynyl group, a 1-propynyl group, and a 1-butynyl group.

10. The dispersant of claim 1, wherein the $C_4$ to $C_{10}$ alkenyne group is selected from the group consisting of a pent-1-en-4-yne group, and a pent-3-en-1-yne group.

11. The dispersant of claim 1, wherein at least one of a, b, c, and d in Chemical Formula 1 is an integer of 0.

12. The dispersant of claim 1, wherein in Chemical Formula 2, $R^7$ is an O atom and $R^8$ is a $C_2$ to $C_6$ saturated hydrocarbon chain.

13. The dispersant of claim 1, wherein $R^9$ in Chemical Formula 3 is a $C_2$ to $C_6$ saturated hydrocarbon chain.

14. The dispersant of claim 1, wherein $R^{10}$ in Chemical Formula 4 is a $C_2$ to $C_6$ saturated hydrocarbon chain.

15. The dispersant of claim 1, wherein the compound represented by Chemical Formula 1 comprises a compound represented by the following Chemical Formula 5:

[Chemical Formula 5]

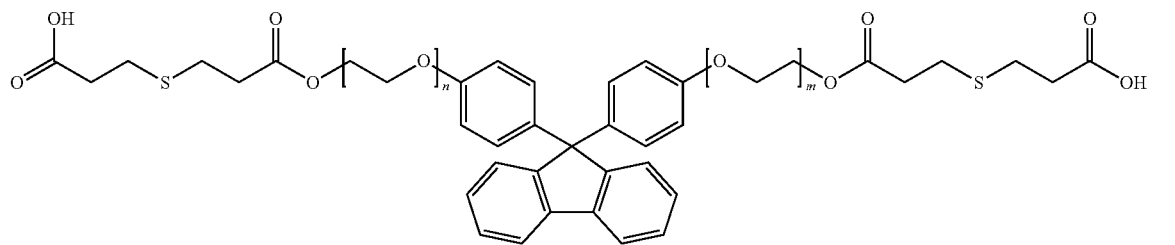

wherein each of n and m is an integer of 2 to 20.

16. The dispersant of claim 1, wherein the compound represented by Chemical Formula 1 comprises a compound represented by the following Chemical Formula 6:

[Chemical Formula 6]

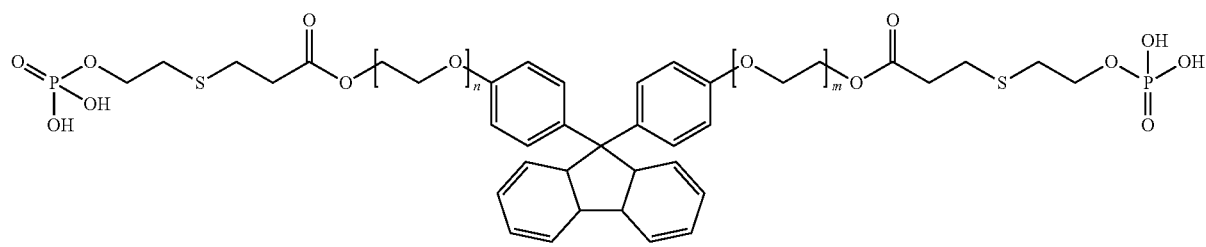

wherein each of n and m is an integer of 2 to 20.

17. A composition comprising:

zirconia nanoparticles subjected to a surface treatment with a dispersant; and a solvent, wherein the dispersant is the dispersant of claim 1.

18. The composition of claim 17, wherein the dispersant is adsorbed to the surface of the zirconia nanoparticle.

19. The composition of claim 17, wherein the solvent is selected from the group consisting of tetrahydrofuran, methylene chloride, and chloroform.

20. A dispersant comprising a compound represented by the following Chemical Formula 1:

[Chemical Formula 1]

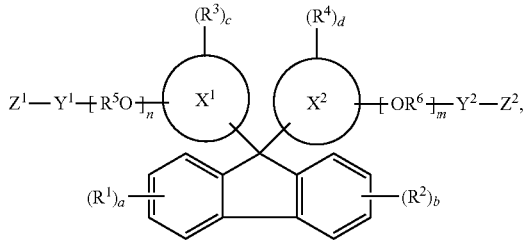

wherein each of $X^1$ and $X^2$ is an aromatic ring, each of $R^1$, $R^2$, $R^3$ and $R^4$ is a substituent, each of a, b, c, and d is an integer of 0 to 4, each of $R^5$ and $R^6$ is an aliphatic chain, each of n and m is an integer of 2 to 20, each of $Y^1$ and $Y^2$ is a bonding group represented by the following Chemical Formula 2, and each of $Z^1$ and $Z^2$ is a terminal group represented by the following Chemical Formula 3 or 4,

[Chemical Formula 2]

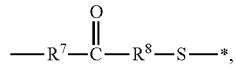

wherein $R^7$ is an O, N, or S atom, $R^8$ is an aliphatic chain, and —* represents a site for linking to $Z^1$ or $Z^2$,

[Chemical Formula 3]

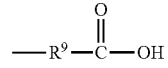

wherein $R^9$ is an aliphatic chain,

[Chemical Formula 4]

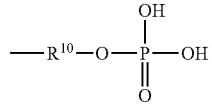

wherein $R^{10}$ is an aliphatic chain, wherein at least one of $X^1$ and $X^2$ in Chemical Formula 1 is selected from the group consisting of a benzene ring, a naphthalene ring, and a biphenyl ring, wherein at least one of $R^5$ and $R^6$ in Chemical Formula 1 is a $C_2$ to $C_6$ saturated hydrocarbon chain, wherein in Chemical Formula 2, $R^7$ is an O atom and $R^8$ is a $C_2$ to $C_6$ saturated hydrocarbon chain, wherein $R^9$ in Chemical Formula 3 is a $C_2$ to $C_6$ saturated hydrocarbon chain, and wherein $R^{10}$ in Chemical Formula 4 is a $C_2$ to $C_6$ saturated hydrocarbon chain.

* * * * *